(12) United States Patent
Byun et al.

(10) Patent No.: US 11,428,452 B2
(45) Date of Patent: Aug. 30, 2022

(54) REFRIGERATOR

(71) Applicant: LG ELECTRONICS INC., Seoul (KR)

(72) Inventors: Aejin Byun, Seoul (KR); Hongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 16/635,856

(22) PCT Filed: Jul. 31, 2018

(86) PCT No.: PCT/KR2018/008675
§ 371 (c)(1),
(2) Date: Jan. 31, 2020

(87) PCT Pub. No.: WO2019/027223
PCT Pub. Date: Feb. 7, 2019

(65) Prior Publication Data
US 2020/0370811 A1    Nov. 26, 2020

(30) Foreign Application Priority Data
Aug. 3, 2017   (KR) ..................... 10-2017-0098392

(51) Int. Cl.
*F25C 1/24*        (2018.01)
*F25C 5/182*       (2018.01)
(Continued)

(52) U.S. Cl.
CPC ............... *F25C 1/24* (2013.01); *F25C 5/182* (2013.01); *F25D 11/02* (2013.01); *F25D 23/04* (2013.01)

(58) Field of Classification Search
CPC .... F25C 1/24; F25C 5/182; F25C 5/22; F25D 11/02; F25D 1/02; F25D 23/04
See application file for complete search history.

(56) References Cited

U.S. PATENT DOCUMENTS 3,845,668 A    11/1974   Underwood
5,737,968 A    4/1998    Hardey et al.
(Continued)

FOREIGN PATENT DOCUMENTS

CN        205336029        6/2016
DE        10-2008-054330   5/2010
(Continued)

OTHER PUBLICATIONS

European Search Report dated Mar. 26, 2021 issued in Application No. 18841738.0.
(Continued)

*Primary Examiner* — Elizabeth J Martin
(74) *Attorney, Agent, or Firm* — KED & Associates LLP

(57) ABSTRACT

A motor assembly includes a brushless direct current (BLDC) motor; a gear box in which the BLDC motor is installed; and a power transmission part having a plurality of gears installed in the gear box so as to transmit power generated by the BLDC motor to an ice bin. The BLDC motor comprises: a stator and a rotor rotating with respect to the stator, wherein the rotor may be connected to the power transmission part by a shaft and the stator may be coupled to the gear box in a separable manner.

23 Claims, 18 Drawing Sheets

(51) Int. Cl.
*F25D 11/02* (2006.01)
*F25D 23/04* (2006.01)

(56) References Cited

U.S. PATENT DOCUMENTS

| | | | |
|---|---|---|---|
| 2001/0033111 A1 | 10/2001 | Choi | |
| 2003/0080644 A1 | 5/2003 | Nelson et al. | |
| 2004/0070297 A1* | 4/2004 | Yoon | H02K 5/15 310/90 |
| 2005/0072167 A1 | 4/2005 | Oh | |
| 2011/0265594 A1* | 11/2011 | Ramirez, Jr | F16H 57/039 74/416 |
| 2012/0304680 A1* | 12/2012 | Oh | F25C 5/22 62/320 |
| 2014/0182315 A1* | 7/2014 | Kim | F25C 5/187 62/73 |
| 2016/0072355 A1* | 3/2016 | Jang | H02K 5/1672 310/88 |

FOREIGN PATENT DOCUMENTS

| | | |
|---|---|---|
| DE | 10-2015-117442 | 4/2016 |
| EP | 1522806 | 4/2005 |
| KR | 10-2004-0033386 | 4/2004 |
| KR | 10-2007-0034393 | 3/2007 |
| KR | 10-0710640 | 4/2007 |
| KR | 10-2011-0072367 | 6/2011 |
| KR | 10-1631322 | 6/2016 |

OTHER PUBLICATIONS

Korean Notice of Allowance dated Apr. 9, 2020 issued in Application No. 10-2018-0076533.
European Search Report dated Aug. 2, 2021 issued in Application No. 18841738.0.
International Search Report dated Nov. 28, 2018 issued in Application No. PCT/KR2018/008675.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2018/008675, filed Jul. 31, 2018, which claims priority to Korean Patent Application No. 10-2017-0098392, filed Aug. 3, 2017, whose entire disclosures are hereby incorporated by reference.

TECHNICAL FIELD

The present disclosure relates to a refrigerator.

BACKGROUND ART

Generally, a refrigerator is a device for storing food in a low temperature state by low temperature air.

The refrigerator may include a cabinet in which a storage compartment is provided and a refrigerator door that opens and closes the storage compartment. The storage compartment may include a refrigerating compartment and a freezing compartment, and the refrigerator door may include a refrigerating compartment door that opens and closes the refrigerating compartment and a freezing compartment door that opens and closes the freezing compartment. The storage compartment may include only a freezing compartment or a refrigerating compartment depending on the type of the refrigerator.

The refrigerator may further include an ice making assembly that produces and stores ice using cold air. The ice making assembly may include an ice maker that produces ice and an ice bin in which ice separated from the ice maker is stored.

When a dispenser for dispensing ice is provided in the refrigerator door, the ice making assembly may further include a motor assembly for crushing ice in the ice bin or driving a blade for discharging ice.

Korean Patent Publication No. 10-1631322, a related art document, discloses a refrigerator.

The refrigerator of the related art includes a support mechanism on which an ice maker is seated, an ice bin seated on the support mechanism, and a motor assembly installed at the support mechanism and selectively connected to the ice bin.

The ice bin includes a plurality of rotary blades for discharging ice and a plurality of stationary blades for crushing ice together with the rotary blades.

A plurality of rotary blades may be rotated in a first direction to discharge each ice (uncrushed ice) from the ice bin. The ice of the ice bin is then discharged from the ice bin without interfering with the plurality of stationary blades.

Meanwhile, in order to discharge the crushed ice from the ice bin, the plurality of rotary blades are rotated in a second direction opposite to the first direction. Then, the ice is crushed by the plurality of rotary blades and the plurality of stationary blades and then discharged from the ice bin.

In the process of dispensing each ice, if the ice is entangled in the ice bin, if the ice lies on the rotary blade, or if the ice is caught on the rotary blade and a wall of the ice bin, the rotary blade may not be rotated normally and the ice may not be dispensed.

However, in the case of the related art document, the motor operates to rotate the plurality of rotary blades in the first direction regardless of whether ice is dispensed. Here, when the rotary blade is not rotated normally, the motor may be damaged due to overload thereof. In addition, even though a user operates an operation pad for discharging ice, ice may not be dispensed and the user may misrecognize that the ice making assembly is broken.

In addition, ice must be crushed so that the crushed ice may be dispensed. Here, a dispersion of torque of the motor for crushing ice is large. If the torque of the motor is large, overload of the motor may occur, but the related art does not provide a technique for preventing the overload of the motor.

In addition, in the case of the related art document, the motor is operated if an ice dispensing command is input, and the motor is stopped if the ice dispensing command is not input.

However, although the operation pad is released due to malfunction of a detection part for detecting the operation pad for an ice dispensing command after the operation pad is operated, if the detection part detects the operation of the operation pad, the motor is not stopped but continuously operates to be damaged.

DISCLOSURE

Technical Problem

The present disclosure provides a motor assembly and a refrigerator reduced in volume using a BLDC motor as a motor.

The present disclosure also provides a motor assembly and a refrigerator simplified in assembly process.

The present disclosure also provides a refrigerator in which a stator of a motor is detached from a gear box and replaced.

The present disclosure also provides a refrigerator capable of sensing a load applied to a motor.

Technical Solution

To solve the technical problem as described above, there is provided a motor assembly including a BLDC motor, a gear box in which the BLDC motor is installed, and a power transmission part configured to transmit power generated by the BLDC motor to an ice bin.

The BLDC motor may include a stator and a rotor rotated with respect to the stator, the rotor may be connected to the power transmission part by a shaft, and the stator may be detachably coupled to the gear box.

For a service of the stator, the stator may be detached from the gear box independently in a state where the rotor is connected to the power transmission part.

When the stator is coupled to the gear box, the rotor may be accommodated in a space formed at a central portion of the stator.

The stator may include a first coupling portion and the gear box may include a second coupling portion to which the first coupling portion is detachably coupled.

The first coupling portion and the second coupling portion are released from a coupled state according to a rotational operation of the stator, and when the stator is moved in a direction parallel to a rotation center of the rotor, the stator may be detached from the gear box.

The gear box may include a first installation portion having a cylindrical shape to allow the BLDC motor to be installed therein and a second installation portion integrally formed with the first installation portion.

Here, the plurality of first coupling portions may be arranged to be spaced apart from each other in a circumferential direction of the stator, and the plurality of second coupling portions may be arranged to be spaced apart from each other in the circumferential direction of the first installation portion.

The power transmission part may include a shaft connection portion connected to the shaft penetrating through the bearing support portion, and the shaft may be press-fit into the shaft connection portion.

A second portion of the shaft may include a first cylindrical portion and a second cylindrical portion extending from the first cylindrical portion and having a diameter smaller than that of the first cylindrical portion. The shaft connection portion may include a first accommodation recess accommodating the first cylindrical portion and a second accommodation recess accommodating the second cylindrical portion, and the second cylindrical portion may be press-fit into the second accommodation recess by passing through the first accommodation recess.

The plurality of gears may include first to fourth gears but are not limited thereto.

A first gear, among the plurality of gears, connected to the shaft connection portion may be formed of a first material, and a fourth gear, among the plurality of gears, connected to the ice bin and a third gear engaged with the fourth gear may be formed of a second material.

A second gear, among the plurality of gears, connecting the first gear and the third gear may include a first gear portion and a second gear portion which are integrally formed, the first gear portion may be formed of the first material and the second gear portion may be formed of the same material as the second material.

Here, orders of gears including the first gear portion and the second gear portion may differ according to the number of the plurality of gears.

A second installation portion of the gear box may include a first wall and a second wall extending perpendicularly from an edge of the first wall and the plurality of gears may be installed in a space formed by the first wall and the second wall.

A reinforcing rib may be formed on each of an outer surface and an inner surface of the first wall of the gear box.

The reinforcing rib may include a first rib having a cylindrical shape, a plurality of second ribs extending in different directions from the first rib, and a third rib connecting the plurality of second ribs.

The plurality of second ribs may extend radially from the first rib, for example. The third rib may connect the plurality of second ribs in an arc shape.

At least one of the plurality of gears may be installed at the second installation portion by the shaft, and the first rib may have a shaft accommodation recess in which the shaft is inserted.

The motor assembly may further include: a box cover covering the plurality of gears installed at the second installation portion, and the box cover may have a plurality of embossings for strength enhancement.

The plurality of embossings may include a first embossing and a second embossing in parallel to each other, and rotation centers of some of the plurality of gears may be positioned between the first embossing and the second embossing.

The first embossing may extend to cross a line connecting rotation centers of two adjacent gears among the plurality of gears.

The plurality of embossings may further include a third embossing and a fourth embossing extending in parallel to each other, and rotation centers of the other gears among the plurality of gears may be positioned between the third embossing and the fourth embossing.

Extending directions of the first embossing and the second embossing may be perpendicular to extending directions of the third embossing and the fourth embossing.

Extending directions of the third embossing and the fourth embossing may be parallel to a line connecting rotation centers of two adjacent gears among the plurality of gears.

The gear box may further include a hole through which a rotary shaft of the last gear among the plurality of gears passes and a fifth embossing formed around the hole.

Advantageous Effect

According to the proposed disclosure, a volume of the motor assembly may be reduced using a BLDC motor as a motor.

In addition, according to the present disclosure, the stator may be detachably replaced in the gear box in a state where the rotor is connected to the gear box.

In addition, according to the present disclosure, the stator may be easily coupled to or detached from the gear box.

In addition, according to the present disclosure, the motor may be controlled by detecting a load applied to the motor.

MODE FOR DISCLOSURE

Figure 1:
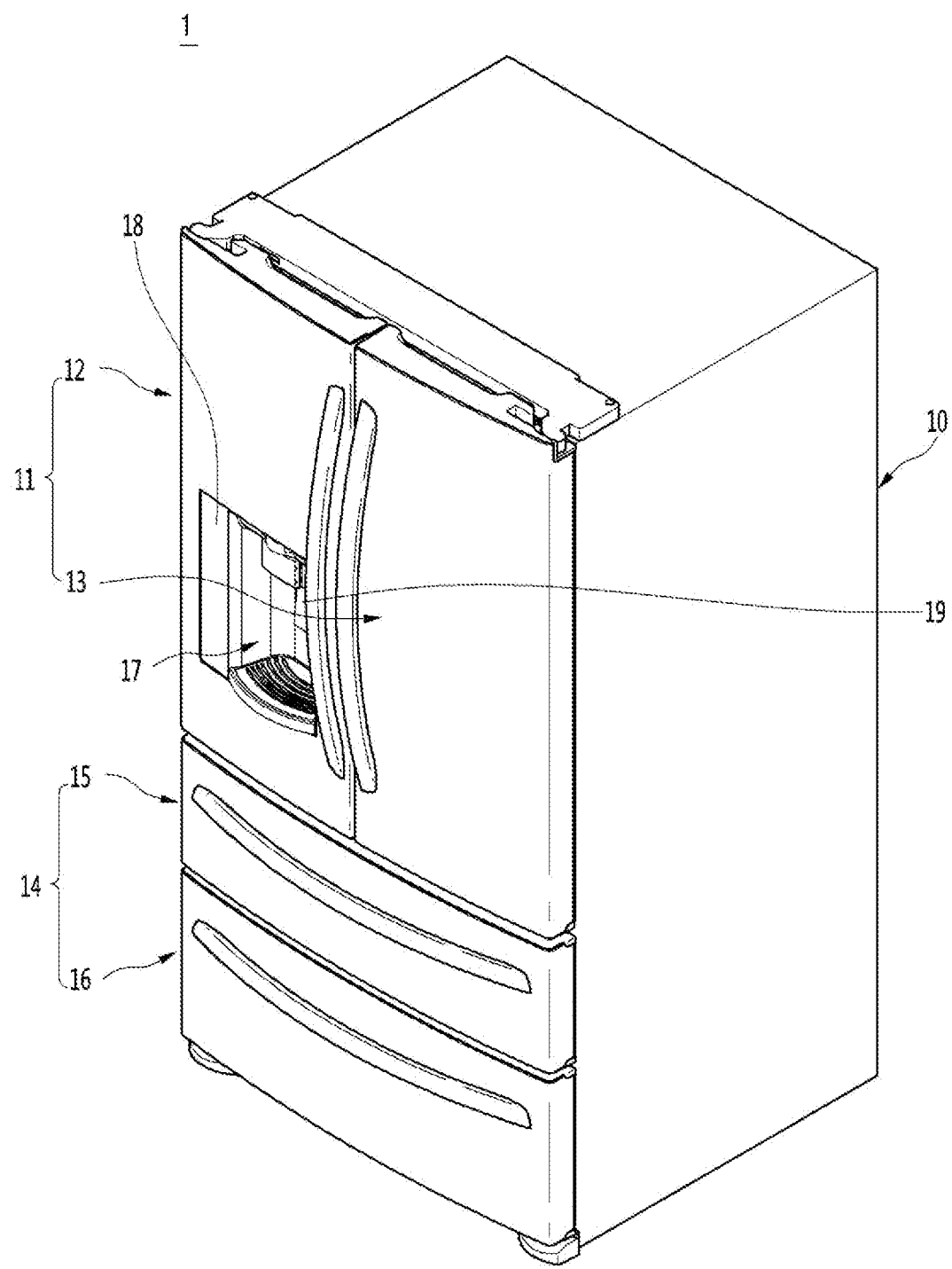
FIG. 1 is a perspective view of a refrigerator in an embodiment of the present disclosure.

Hereinafter, embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present.

Figure 2:
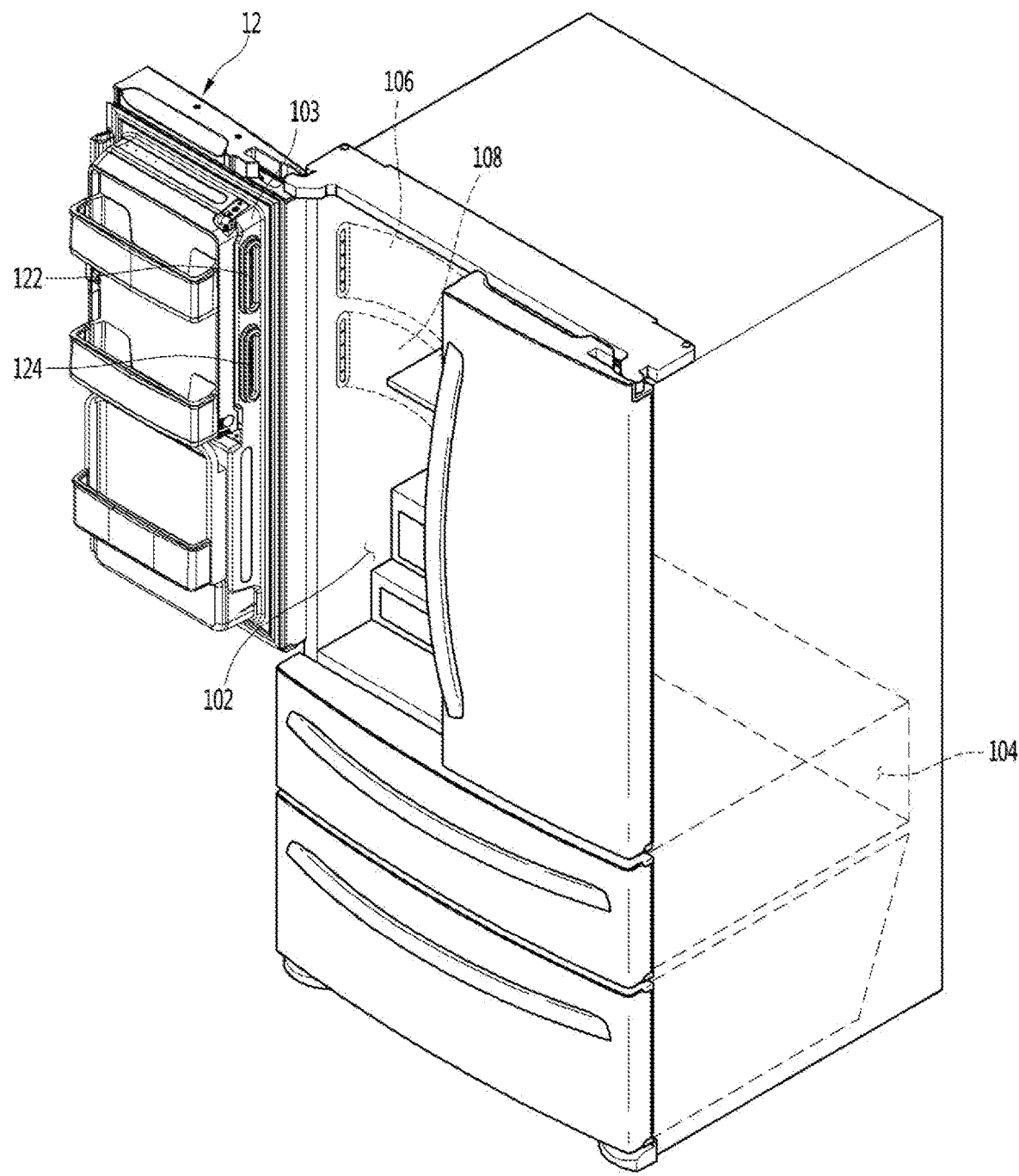
FIG. 2 is a perspective view illustrating a state where a door is partially opened according to an embodiment of the present disclosure.

FIG. 1 is a perspective view of a refrigerator according to an embodiment of the present disclosure and FIG. 2 is a perspective view illustrating a state where a door is partially opened according to an embodiment of the present disclosure.

Referring to FIGS. 1 and 2, a refrigerator 1 according to an embodiment of the present disclosure includes a cabinet 10 forming an appearance and refrigerator doors 11 and 14 movably connected to the cabinet 10.

A storage compartment for storing food may be formed in the cabinet 10. The storage compartment may include a refrigerating compartment 102 and a freezing compartment 104 positioned below the refrigerating compartment 102.

In the present embodiment, as an example, a bottom freeze type refrigerator in which a refrigerating compartment is disposed above a freezing compartment will be described. However, the idea of the present embodiment may also be applied to a refrigerator in which a refrigerating compartment is disposed below a freezing compartment, a refrigerator including only a freezing compartment, or a refrigerator in which a freezing compartment and a refrigerating compartment are arranged left and right.

The refrigerator doors 11 and 14 may include a refrigerating compartment door 11 for opening and closing the refrigerating compartment 102 and a freezing compartment door 14 for opening and closing the freezing compartment 104.

The refrigerating compartment door 11 may include a plurality of doors 12 and 13 disposed left and right. The plurality of doors 12 and 13 may include a first refrigerating compartment door 12 and a second refrigerating compartment door 13 disposed on the right of the first refrigerating compartment door 12. The first refrigerating compartment door 12 and the second refrigerating compartment door 13 may move independently.

The freezing compartment door 14 may include a plurality of doors 15 and 16 disposed up and down.

The plurality of doors 15 and 16 may include a first freezing compartment door 15 and a second freezing compartment door 16 positioned below the first freezing compartment door 15.

The first and second refrigerating compartment doors 12 and 13 may rotate or the first and second freezing compartment doors 15 and 16 may slidably move.

As another example, the first freezing compartment door 15 and the second freezing compartment door 16 may be disposed on the left and right to rotate each other.

Meanwhile, one of the first and second refrigerating compartment doors may be provided with a dispenser 17 for dispensing water and/or ice. In FIG. 1, for example, the dispenser 17 is provided at the first refrigerating compartment door 12. Alternatively, the dispenser 17 may be provided at the freezing compartment doors 15 and 16.

In addition, one of the first and second refrigerating compartment doors may be provided with an ice making assembly (to be described later) for producing and storing ice. Alternatively, the ice making assembly may be provided at the freezing compartment 104.

In the present embodiment, the dispenser 17 and the ice making assembly may be provided at the first refrigerating compartment door 12 or the second refrigerating compartment door 13. Therefore, hereinafter, the dispenser 17 and the ice making assembly will be described as being disposed at the refrigerating compartment door 11 commonly called the first refrigerating compartment door 12 and the second refrigerating compartment door 13.

The refrigerating compartment door 11 may be provided with an input part 18 for selecting a type of ice to be dispensed. In addition, the dispenser 17 may include an operation pad 19 operated by a user to dispense water or ice. Alternatively, a button or a touch panel may be provided to input a water or ice dispensing command.

Figure 3:
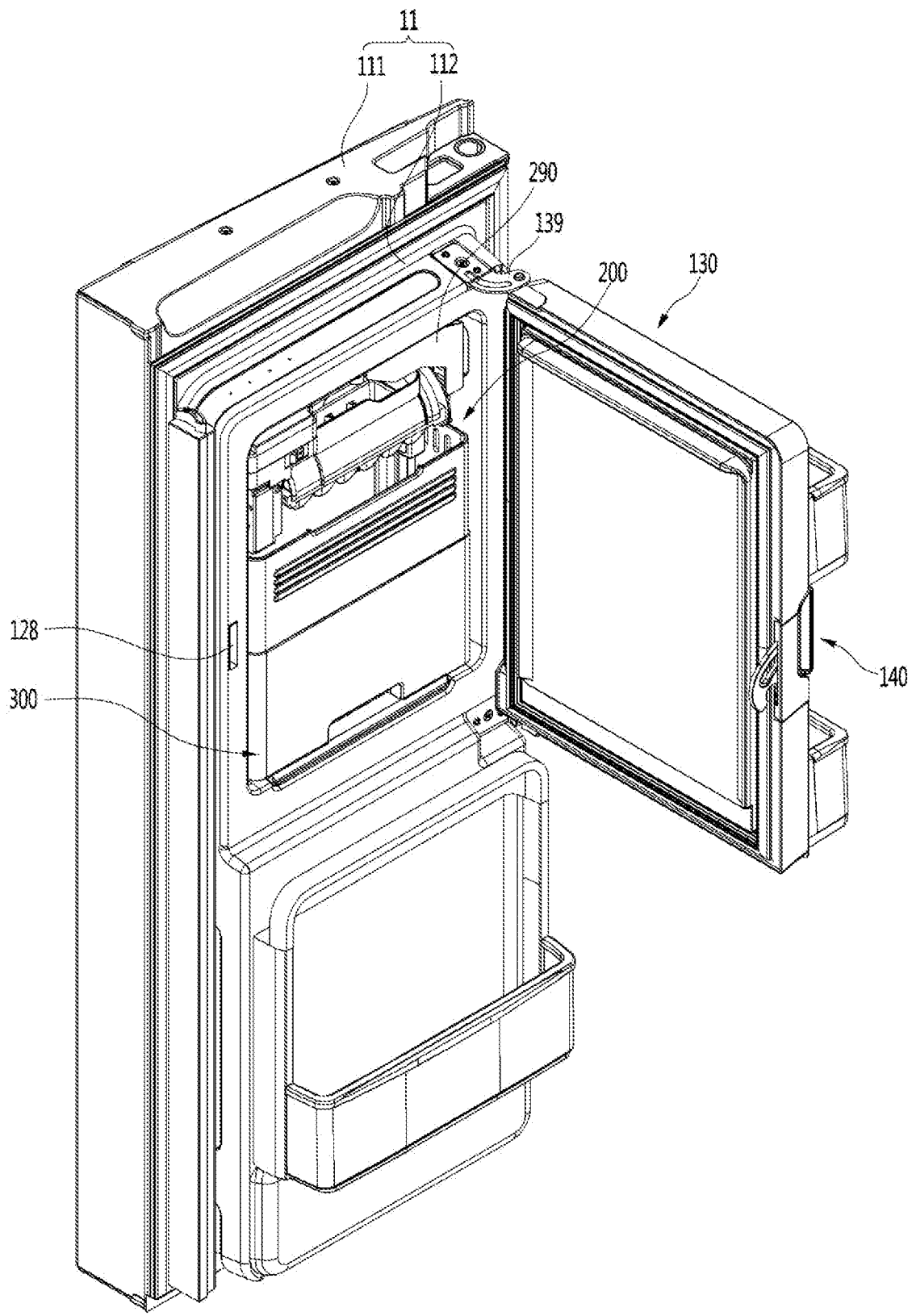
FIG. 3 is a perspective view of a refrigerating compartment door in a state where an ice making compartment door is opened according to an embodiment of the present disclosure.
Figure 4:
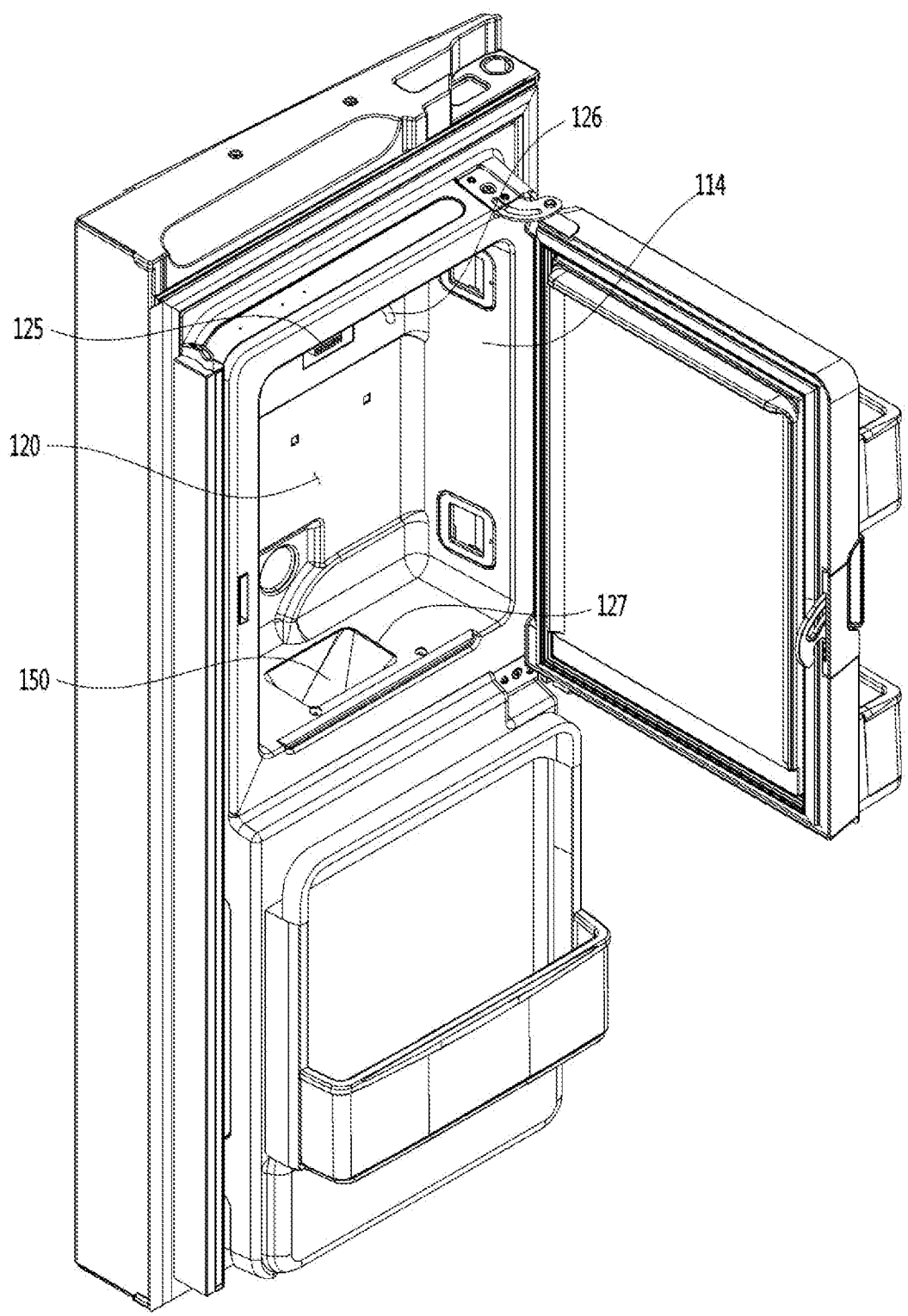
FIG. 4 is a perspective view of a refrigerating compartment door in a state where an ice making assembly is removed from an ice making compartment according to an embodiment of the present disclosure.

FIG. 3 is a perspective view of a refrigerating compartment door in a state where an ice making compartment door is open according to an embodiment of the present disclosure and FIG. 4 is a refrigerating compartment door in a state where an ice making assembly is removed from an ice making compartment according to an embodiment of the present disclosure.

Referring to FIGS. 1 to 4, the refrigerating compartment door 11 may include an outer case 111 and a door liner 112 coupled to the outer case 111. The door liner 112 may form a rear surface of the refrigerating compartment door 11.

The door liner 112 may form an ice making compartment 120. An ice making assembly 200 for producing and storing ice is disposed in the ice making compartment 120. The ice making compartment 120 may be opened or closed by an ice making compartment door 130. The ice making compartment door 130 may be rotatably connected to the door liner 112 by a hinge 139.

In addition, the ice making compartment door 130 may have a handle 140 allowing the ice making compartment door 130 to be coupled to the door liner 112 while the ice making compartment door 130 closes the ice making compartment 120.

A handle coupling portion 128 to which a portion of the handle 140 is coupled may be formed at the door liner 112. The handle coupling portion 128 may accommodation a portion of the handle 140.

The cabinet 10 includes a main body supply duct 106 for supplying cold air to the ice making compartment 120 and a main body recovery duct 108 for recovering cold air from the ice making compartment 120. The main body supply duct 106 and the main body recovery duct 108 may be in communication with a space where an evaporator (not shown) is located.

The refrigerating compartment door 11 includes a door supply duct 122 for supplying cold air from the main body supply duct 106 to the ice making compartment and a door recovery duct 124 recovering cold air from the ice making compartment 120 to the main body recovery duct 108.

The door supply duct 122 and the door recovery duct 124 extend from an outer wall 113 of the door liner 110 to an inner wall 114 forming the ice making compartment 120.

The door supply duct 122 and the door recovery duct 124 are disposed in a vertical direction and the door supply duct 122 is disposed above the door recovery duct 124. However, in the present embodiment, the positions of the door supply duct 122 and the door recovery duct 124 are not limited thereto.

In addition, in a state where the refrigerating compartment door 11 closes the refrigerating compartment 102, the door supply duct 122 is aligned with and communicates with the main body supply duct 106 and the door recovery duct 124 is aligned with and communicates with the main body recovery duct 108.

The ice making compartment 200 includes a cold air duct 290 for guiding the cold air flowing through the door supply duct 122 to the ice making assembly 200.

The cold air duct 290 has a flow path through which cold air flows, and the cold air flowing through the cold air duct 290 is finally supplied to the ice making assembly 200 side. The cold air may be concentrated on the ice making assembly 200 side by the cold air duct 290, ice may be rapidly produced.

An opening 127 through which ice is discharged is formed on a lower side of the inner wall 114 of the door liner 112 forming the ice making compartment 120. In addition, an ice duct 150 communicating with the opening 127 may be disposed on a lower side of the ice making compartment 120.

Figure 5:
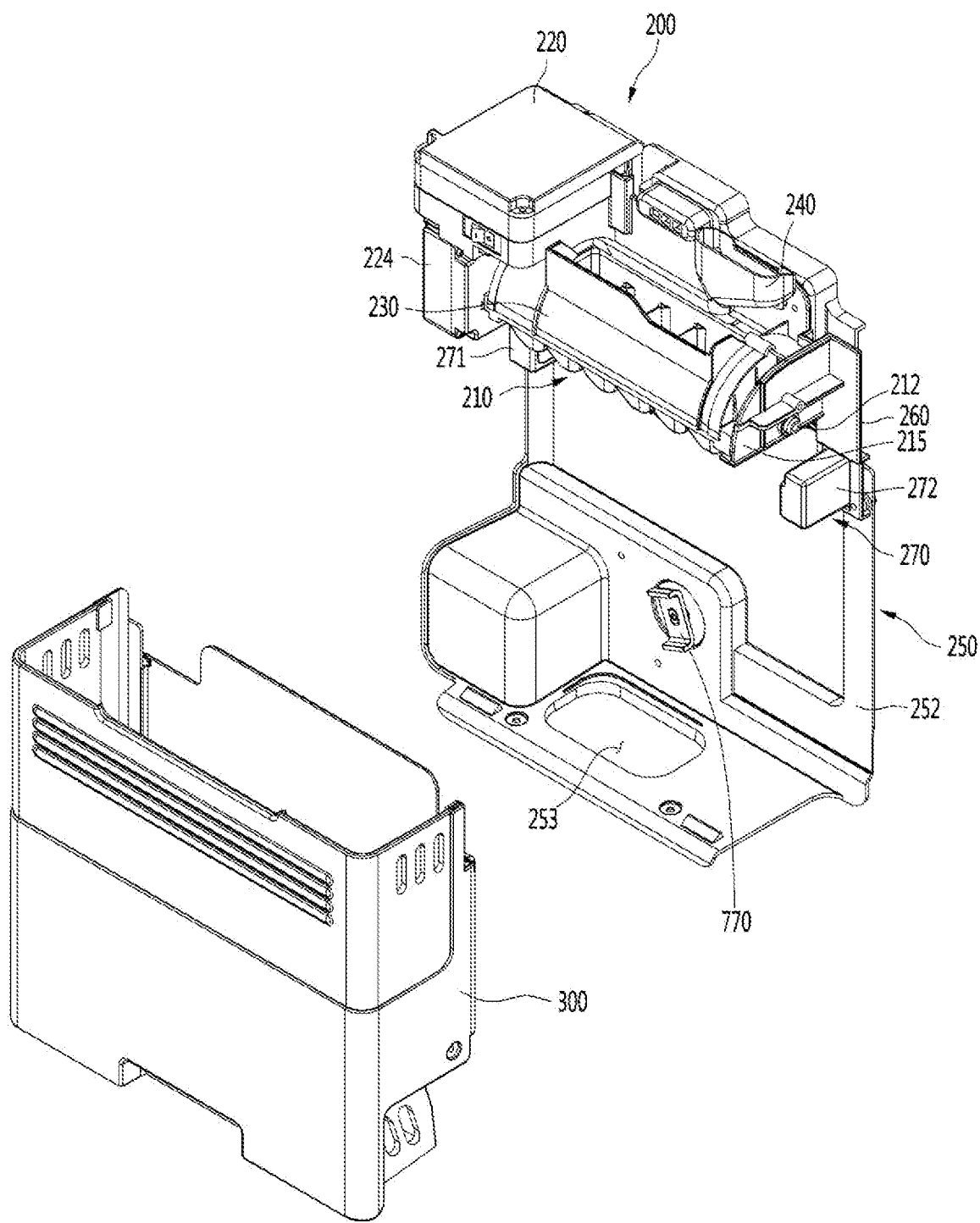
FIG. 5 is a view showing a state where an ice bin is separated from a support mechanism according to an embodiment of the present disclosure.
Figure 6:
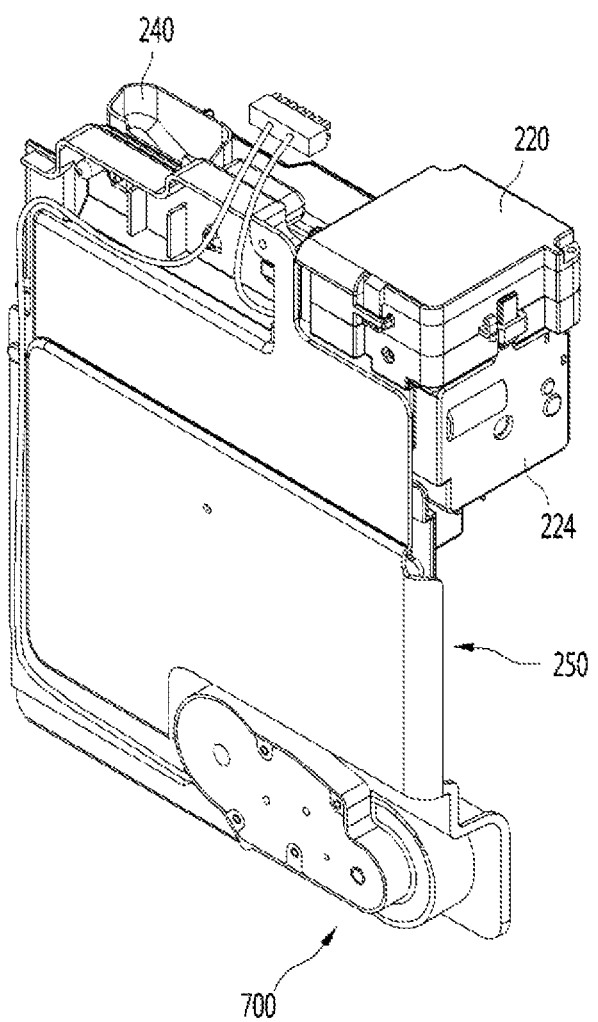
FIG. 6 is a view showing a state where a motor assembly is coupled to the rear of a support mechanism.

FIG. 5 is a view illustrating a state where an ice bin is separated from a support mechanism according to an embodiment of the present disclosure and FIG. 6 is a view illustrating a state where a motor assembly is coupled to a rear side of the support mechanism.

Referring to FIGS. 5 and 6, the ice making assembly 200 according to an embodiment of the present disclosure may define a space where ice is produced and include an ice maker 210 supporting produced ice.

The ice making assembly 200 may further include a driving source 220 that provides power for automatically rotating the ice maker 210 to separate the ice from the ice maker 210 and a power transmission box 224 for transmitting power of the ice maker 210.

The ice making assembly 200 may further include a cover 230 that covers the ice maker 210 to prevent overflow of water when water is supplied to the ice maker 210 and a water guiding portion 240 guiding water supplied from a water supply pipe 126 to the ice maker 210.

The ice making assembly 200 may include a support mechanism 250 having a seating portion 215 on which the ice maker 210 is seated, an ice bin configured to store ice separated from the ice maker 210, and a motor assembly 700 connected to the ice bin 300.

The support mechanism 250 may include a first support portion 252 and a second support portion 260 coupled to the first support portion 252. Alternatively, the first support portion 252 and the second support portion 260 may be integrally formed.

The first support portion 252 may be seated in the ice making compartment 120. The motor assembly 700 is mounted on the first support portion 252. In this case, the motor assembly 700 may be coupled to a rear side of the support mechanism 250.

Meanwhile, the ice bin 300 may be seated on a bottom surface of the first support portion 252 on the front of the support mechanism 250. That is, the first support portion 252 may support the ice bin 300.

In order to transmit power of the motor assembly 700 to the ice bin 300, a connection member 770 may be connected to the motor assembly 700 on the front of the support mechanism 250. Then, the connection member 770 may be connected to the ice bin 300 while the ice bin 300 is supported on the front of the support mechanism 250.

An ice opening 253 through which ice discharged from the ice bin 300 passes may be formed on a bottom surface of the first support portion 252.

When the ice bin 300 is seated on the first support portion 252, the motor assembly 700 is connected to the ice bin 300 by the connection member 770. In this embodiment, a state where the ice bin 300 is seated on the first support portion 252 may refer to a state where the ice bin 300 is accommodated in the ice making compartment 120.

A seating portion 215 on which the ice maker 210 is seated may be formed at the second support portion 260.

A rotary shaft 212 is provided on one side of the ice maker 210 and rotatably connected to the mounting portion 215. An extending portion (not shown) extending from the power transmission box 224 may be connected to the other side of the ice maker 210.

An ice fullness detector 270 may be installed at the second support portion 260 at a position spaced apart from the ice maker 210. In addition, the ice fullness sensor 270 is located below the ice maker 210.

The ice fullness detector 270 includes a transmitter 271 transmitting a signal and a receiver 272 spaced apart from the transmitter 271 and receiving the signal from the transmitter 271. The transmitter 271 and the receiver 272 are positioned in an internal space of the ice bin 300 in a state where the ice bin 300 is seated on the first support portion 252.

Figure 7:
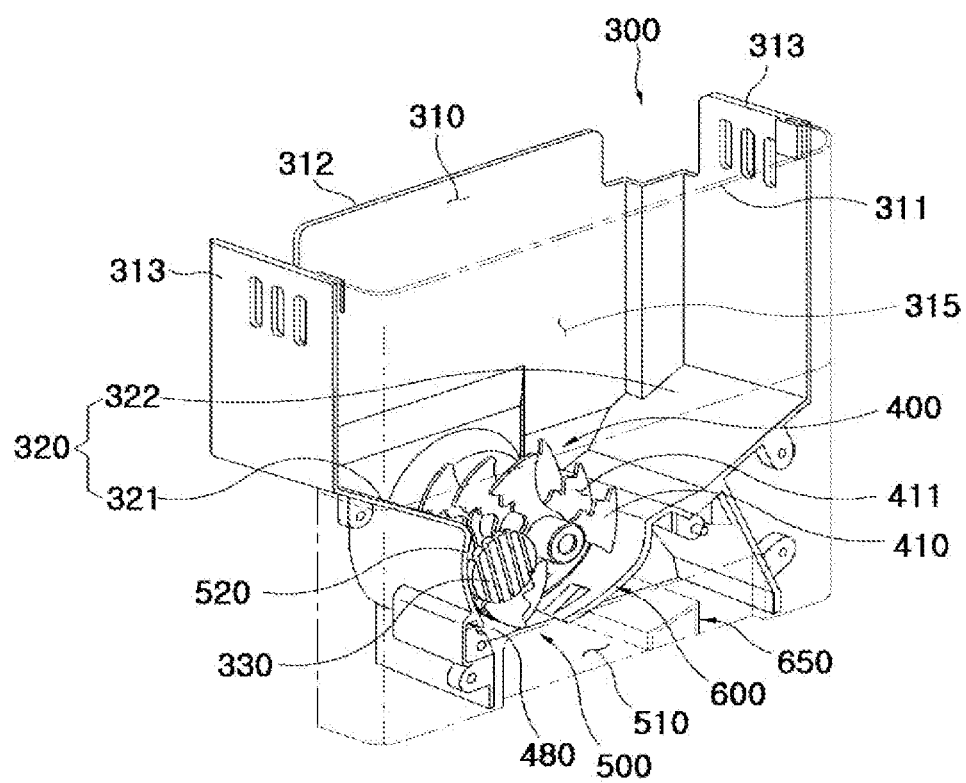
FIG. 7 is a perspective view of an ice bin according to an embodiment of the present disclosure.

FIG. 7 is a perspective view of an ice bin according to an embodiment of the present disclosure.

Referring to FIG. 7, the ice bin 300 has an opening 310 formed at an upper portion thereof. The ice bin 300 includes a front wall 311, a rear wall 312, and opposing side walls 313.

The inside of the ice bin 300 is provided with an inclined guide surface 320 for supporting stored ice and guiding the stored ice to slide downward by a self-load.

An ice storage space 315 in which ice is stored is formed by the front wall 311, the rear wall 312, the opposing side walls 313, and the inclined guide surface 320.

The inclined guide surface 320 may include a first inclined guide surface 321 and a second inclined guide surface 322. The first inclined guide surface 321 may be inclined downward toward a central portion from one of the opposing side walls 313, and the second inclined guide surface 322 may be inclined downward toward the central portion from the other of the opposing side walls 313.

A movable part 400 for discharging ice accommodated in the ice bin 300 to the outside of the ice bin 300 may be provided between the first inclined guide surface 321 and the second inclined guide surface 322.

The movable part 400 may include a plurality of rotary blades 410 to facilitate discharge of ice. The plurality of rotary blades 410 are spaced apart from each other, and a space 411 is formed between two adjacent rotary blades 410.

Ice placed on the first inclined guide surface 321 and the second inclined guide surface 322 is moved to the movable part 400 side by a self-load and then discharged to the outside by the operation of the movable part 400.

A discharge part 500 having an outlet 510 through which ice is discharged may be provided between the first inclined guide surface 321 and the second inclined guide surface 322. In addition, the movable part 400 may be rotatably provided in the discharge part 500.

The movable part 400 may be rotated in both directions by the motor assembly 700.

For example, in order to discharge each ice (uncrushed ice) from the discharge part 500, the movable part 400 may be rotated in the first direction.

Meanwhile, in order to discharge crushed ice from the discharge part 500, the movable part 400 may be rotated in a second direction opposite to the first direction.

A plurality of stationary blades 480 for crushing ice together with the rotary blade 410 of the movable part 400 may be provided on one side below the movable part 400, i.e., on one side of the discharge part 500, when the movable part 400 rotates in the first direction.

The plurality of stationary blades 480 are spaced apart from each other, and the rotary blade 410 passes through a space between the plurality of stationary blades 480.

In a state where the ice is caught between the stationary blade 480 and the rotary blade 410, when the rotary blade 410 presses ice, while being rotated, the ice is crushed and pieces of ice may be discharged from the discharge part 500.

Meanwhile, an opening member 600 allowing the outlet 510 and the ice storage space 315 to selectively communicate with each other so that each ice is discharged when the movable part 400 rotates in the second direction may be provided on the other side below the movable part 400, i.e., on the other side of the discharge part 500.

An operation limiting portion 650 preventing ice in each ice state from being excessively discharged by limiting an operation range of the opening and closing member 600 is provided below the opening and closing member 600.

The discharge part 500 is provided with a discharge guide wall 520 formed in a shape corresponding to a rotation trace of the rotary blade 410. The stationary blade 480 is mounted below the discharge guide wall 520.

The discharge guide wall 500 prevents the crushed ice pieces from remaining at the discharge part 500. In order to prevent ice from being caught between the rotary blade 410 and the front wall 311 of the ice bin 300, an ice insertion preventing portion 330 protruding toward the rotary blade 410 may be provided on a rear surface of the front wall 311 of the ice bin 300.

Figure 8:
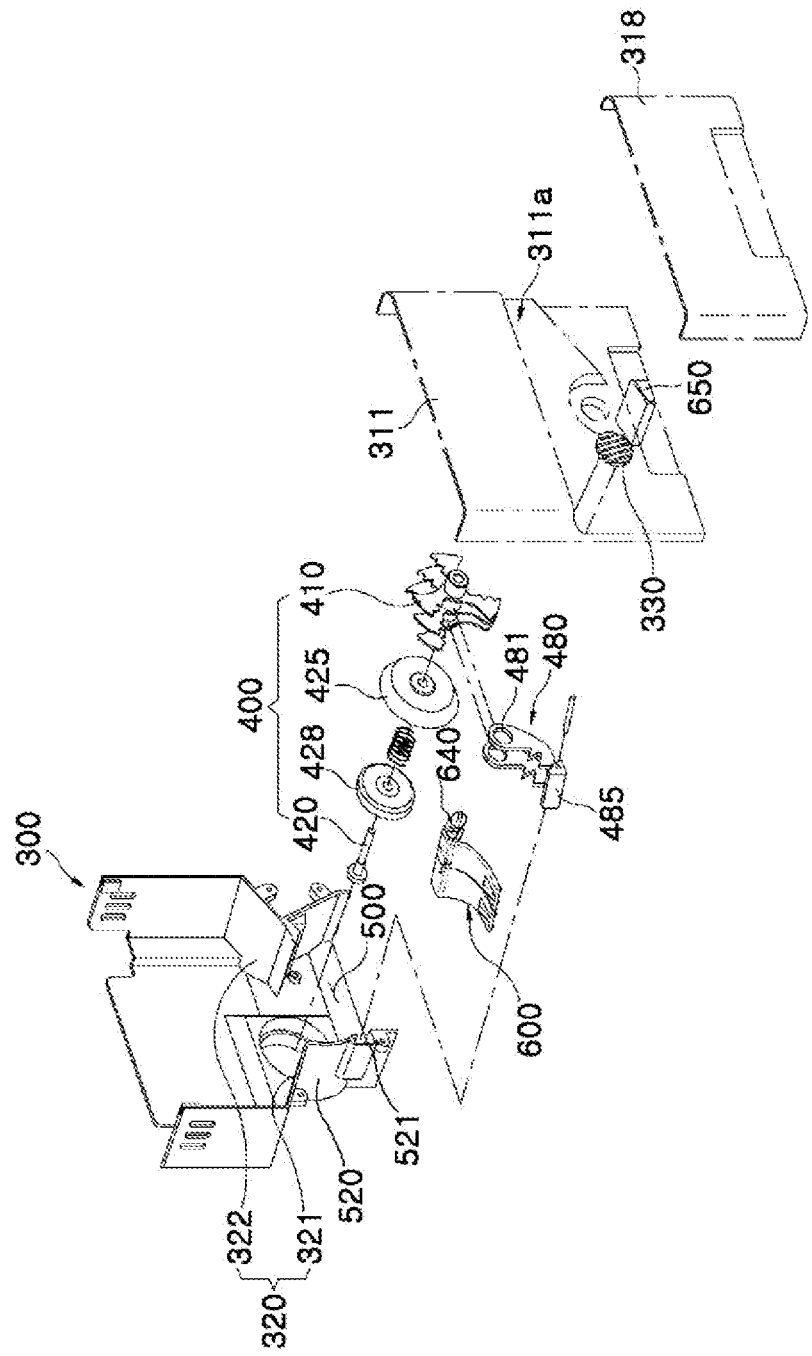
FIG. 8 is an exploded perspective view of an ice bin according to an embodiment of the present disclosure.

FIG. 8 is an exploded perspective view of an ice bin according to an embodiment of the present disclosure.

Referring to FIGS. 7 and 8, the plurality of rotary blades 410 are installed on a rotary shaft 420. The rotary shaft 420 passes through a support plate 425 and a connection plate 428 connected to the motor assembly 700. The rotary shaft 420 is disposed in a horizontal direction inside the ice bin 300.

The plurality of rotary blades 410 are arranged to be spaced apart from each other in a direction parallel to an extending direction of the rotary shaft 420.

One side of the plurality of stationary blades 480 is connected to the rotary shaft 420. That is, the rotary shaft 420 passes through the plurality of stationary blades 480. Each of the stationary blades has a through hole 481 through which the rotary shaft 420 passes.

Here, a size of the through hole 481 may be larger than a diameter of the rotary shaft 420 so that the stationary blade 480 may not move while the rotary shaft 420 rotates.

The plurality of rotary blades 410 and the plurality of stationary blades 480 are alternately arranged in a direction parallel to the extending direction of the rotary shaft 420.

The other side of the plurality of stationary blades 480 is fixed to a lower side of the discharge guide wall 520 as described above. A fixed member 485 may be connected to the other side of the plurality of stationary blades 480 and may be inserted into a recess 521 formed on the discharge guide wall 520.

Meanwhile, the opening and closing member 600 may be provided as member or as a plurality of members and may be disposed on the side of the plurality of stationary blades 480.

The opening and closing member 600 may be rotatably provided at the discharge part 500 and may be formed of an elastic material or may be supported by an elastic member 540 such as a spring.

This is to allow an end portion thereof to move downward due to a pressing action of ice and to return to its original position when the pressing action of the ice is released.

After the movable part 400, the stationary blade 480, the opening and closing member 600 are mounted at the ice bin 300, a front plate 311a forming the front wall 311 of the ice bin 300 311a may be mounted.

A cover member 318 may be provided on a lower portion of a front surface of the front plate 311a to prevent the opening and closing member 600 or the stationary blade 480 from being exposed to the outside.

Figure 9:
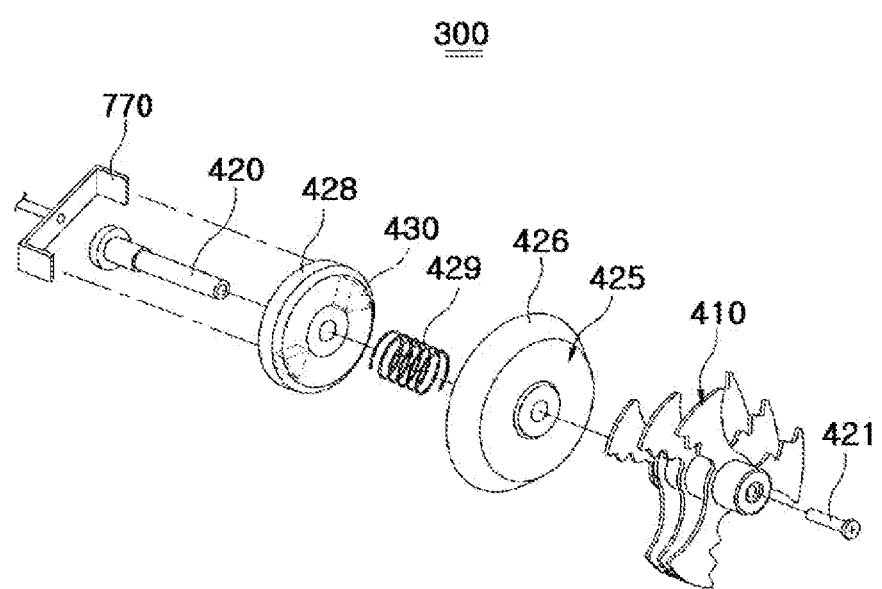
FIG. 9 is an exploded perspective view of a movable part of an ice bin according to an embodiment of the present disclosure.

FIG. 9 is an exploded perspective view of a movable part of an ice bin according to an embodiment of the present disclosure.

Referring to FIGS. 7 to 9, a coil spring type elastic member 429 may be disposed between the support plate 425 and the connection plate 428 to elastically support the connection plate 428.

An insertion member may be inserted into a front end portion of the rotary shaft 420 in a state where the rotary blade 410, the support plate 425, the connection plate 428, and the elastic member 429 are coupled to the rotary shaft 420.

A connection member 770 selectively connected to the connection plate 428 is connected to the motor assembly 700. The connection plate 428 is provided with a protrusion 430 allowing the connection member 770 to be caught therein.

In a state where a user accommodates the ice bin 300 in the ice making compartment 120, when the protrusion 430 and opposing ends of the connection member 770 are aligned, the connection member 770 is not caught at the protrusion 430. In this case, the guide plate 428 moves in a direction toward the support plate 425 by the elastic member 429.

Thereafter, when alignment of the opposing ends of the connection member 770 and the protrusion 430 is released by a continuous operation of the motor assembly 700, the connection plate 428 is moved backward by the elastic member 429 and the opposing ends of the connection member 770 are caught by the protrusion 430.

Meanwhile, the support plate 425 may be formed with an inclined surface 426 to smoothly move ice located on a side surface of the support plate 425 toward the plurality of rotary blades 410.

Figure 10:
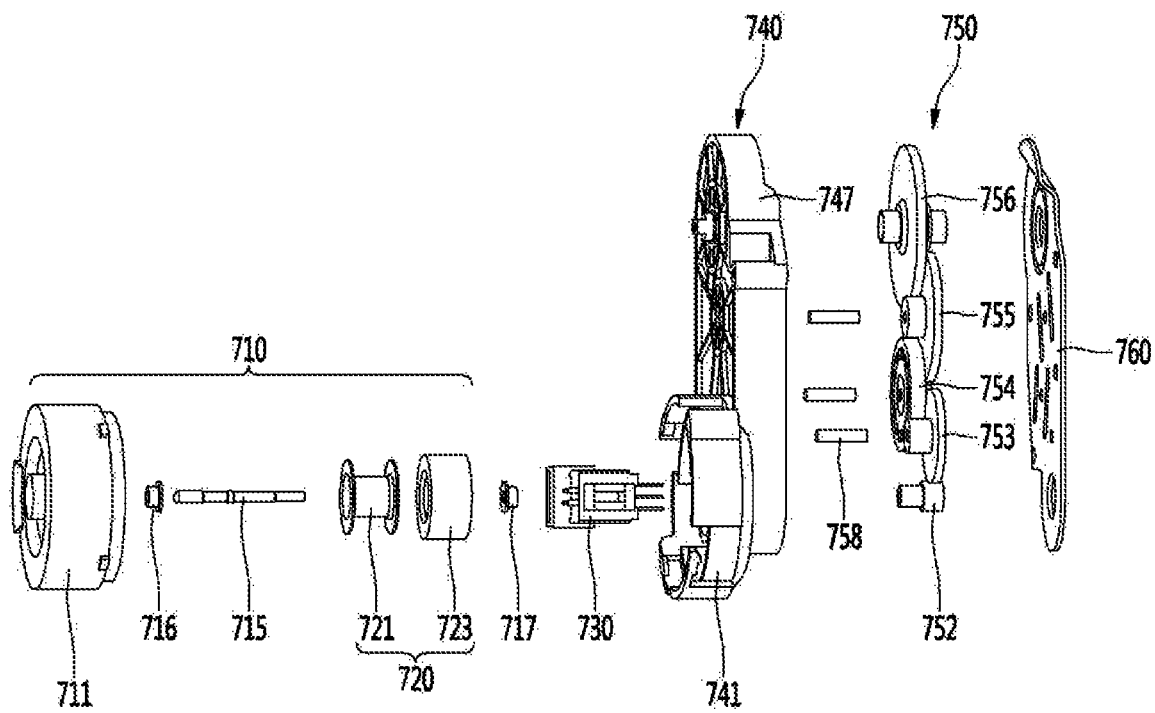
FIG. 10 is an exploded perspective view of a motor assembly according to an embodiment of the present disclosure.
Figure 11:
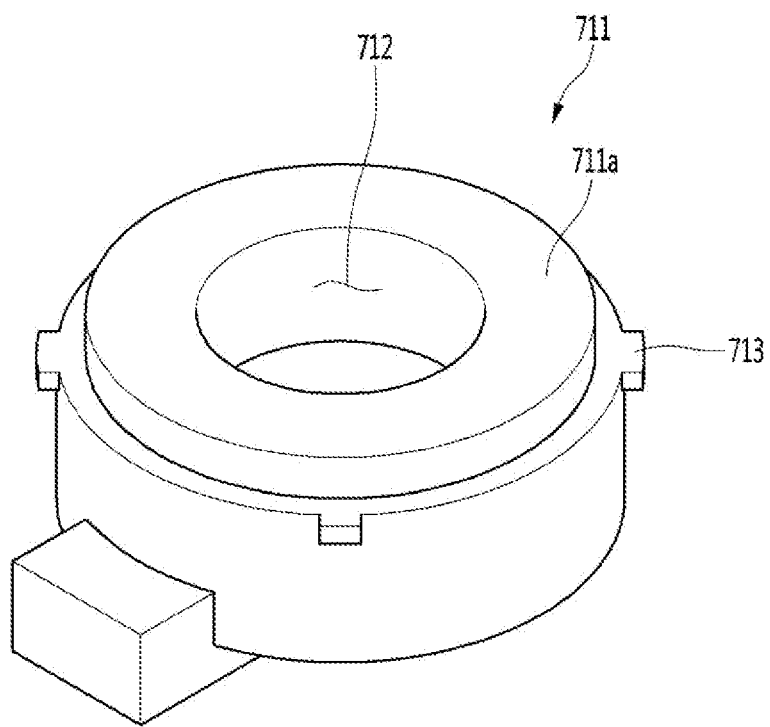
FIG. 11 is a perspective view of a stator of a motor according to an embodiment of the present disclosure.
Figure 12:
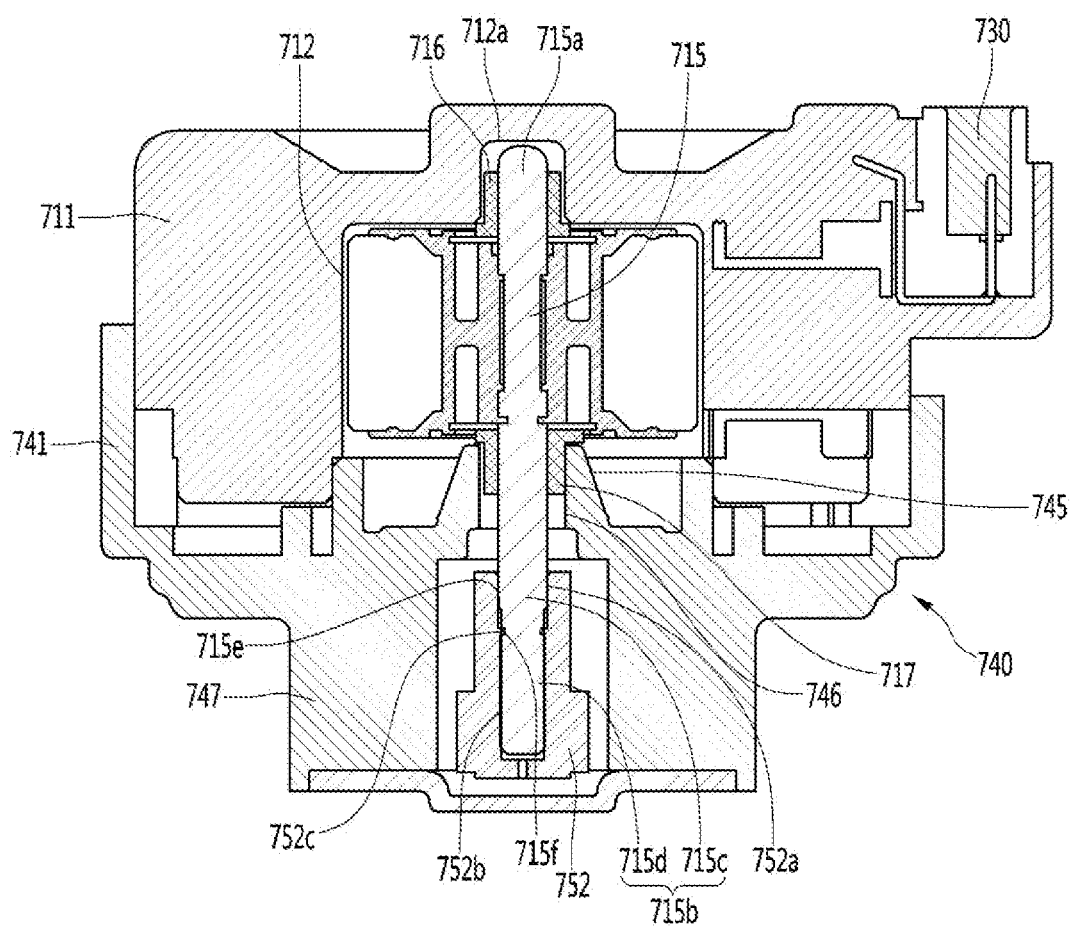
FIG. 12 is a cross-sectional view showing a state where a motor is installed in a gear box of the present disclosure.
Figure 13:
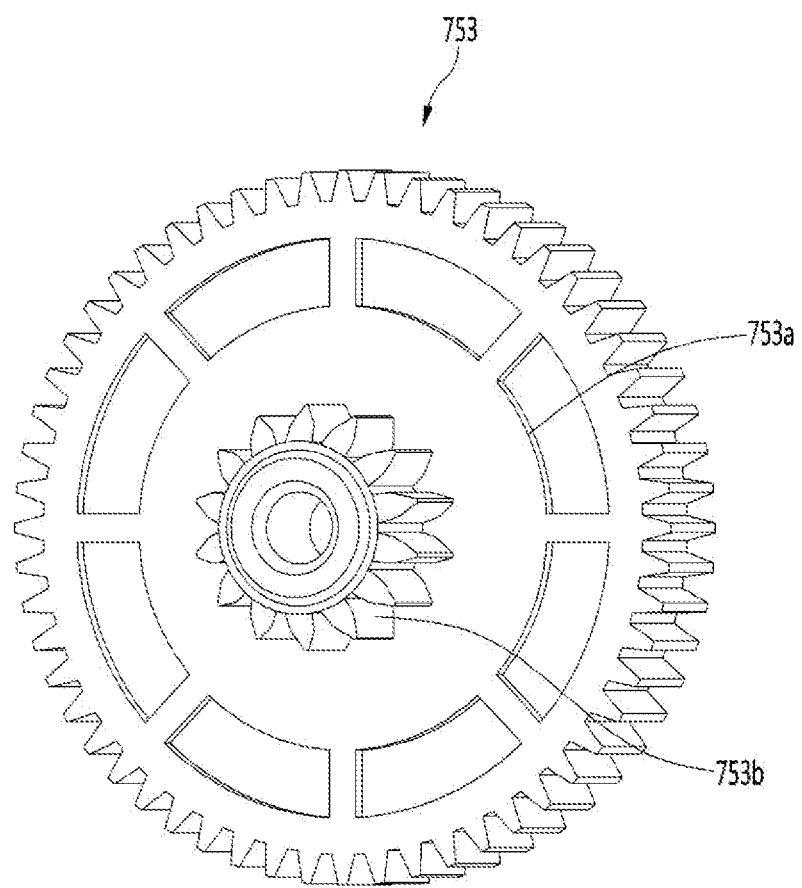
FIG. 13 is a perspective view of some gears of a power transmission part according to an embodiment of the present disclosure.

FIG. 10 is an exploded perspective view of a motor assembly according to an embodiment of the present disclosure and FIG. 11 is a perspective view of a stator of a motor according to an embodiment of the present disclosure. FIG. 12 is a cross-sectional view showing a state where a motor is installed in a gear box of the present disclosure. FIG. 13 is a perspective view of some gears of a power transmission part according to an embodiment of the present disclosure.

Referring to FIGS. 10 to 13, the motor assembly 700 according to an embodiment of the present disclosure includes a motor 710, a gear box 740 in which the motor 710 is installed, and a power transmission part 750 installed in the gear box 740.

The motor 710 may be a BLDC motor. Due to characteristics of the BLDC motor, the BLDC motor outputs a pulse signal, and a controller (not shown) connected to the motor 410 may detect a load applied to the motor 410 based on the number of pulses output from the motor. By detecting the load applied to the motor 410, the controller may control a rotation direction or a rotation speed of the motor 410.

The motor 710 may include a stator 711 and a rotor 720 rotated with respect to the stator 711.

The stator 711 may include a housing 711a and a coil (not shown) provided in the housing 711a. The coil may be wound around a stator core (not shown), and the housing 711a may be integrally formed with the stator core by insert injection molding in a state where the coil is wound around the stator core.

A space 712 allowing the rotor 720 to be positioned therein is formed at a central portion of the housing 711a.

A connector 730 for supplying current may be connected to the coil located in the housing 711a. The connector 730 may be installed at the housing 411a.

For example, in a state where the connector 730 is connected to the coil, the housing 711a may be integrally formed with the connector 730 by insert injection molding. Therefore, since a connection portion of the connector 730 and the coil is located in the housing 711a, insulating performance is improved. The connector 730 may be connected to the controller.

The rotor 720 may be accommodated in the space 712 in the housing 711a. In this case, the rotor 720 may exist as a component independent of the stator 711.

That is, the rotor 720 is not located in the housing 711a of the stator 711 and is accommodated in the space 712 formed in the housing 711a outside the housing 711a of the stator 711. In this case, the stator 711 and the rotor 720 may be separated from each other without disassembling the motor 710.

The rotor 720 may include a magnet 723 and a magnet supporter 721 supporting the magnet 723. For example, the magnet 723 may be arranged in a circumferential direction of the magnet supporter 721.

The motor 710 may further include a shaft 715 connected to the rotor 720.

The shaft 715 may be connected to the magnet supporter 721 and rotated together with the magnet supporter 721. For example, the shaft 715 may be press-fit into the magnet supporter 721. The shaft 715 may pass through the magnet supporter 721.

In a state where the shaft 715 is connected to the magnet supporter 721, a first portion 715a of the shaft 415 may pass through the magnet supporter 721 and then protrude from the magnet supporter 721 in a first direction (upward with reference to FIG. 12).

A first bearing 716 may be coupled to the first portion 415a of the shaft 715 protruding from the magnet supporter 721. For example, the first portion 715a of the shaft 715 may be coupled to penetrate through the first bearing 716.

For example, the first bearing 716 may be formed of a polyphenylene sulfide (PPS) material.

The housing 711a may be provided with a recess 712a for accommodating the first portion 715a of the shaft 715. The recess 712a may be depressed in the first direction in the space 712.

The first bearing 716 may be coupled to the recess 712a. Accordingly, the first bearing 716 may prevent the shaft 715 from coming into direct contact with the housing 711a.

In a state where the shaft 715 is connected to the magnet supporter 721, a second portion 715b of the shaft 715 may pass through the magnet supporter 721 and then protrude from the magnet supporter in a second direction (downward with reference to FIG. 12).

In this case, a length of the second portion 715b of the shaft 715 may be longer than that of the first portion 715a.

In addition, a second bearing 717 may be coupled to the second portion 715b of the shaft 715. For example, the second portion 715b of the shaft 715 may be coupled to penetrate through the second bearing 717.

For example, the second bearing 716 may be formed of a polyphenylene sulfide (PPS) material.

The second portion 715b of the shaft 715 may be connected to a shaft connection portion 752 (or a shaft connection gear) to be described later.

The second portion 715b of the shaft 715 may be press-fit into the shaft connection portion 752.

Specifically, the second portion 715b of the shaft 715 may include a first cylindrical portion 715c and a second cylindrical portion 715d extending from the first cylindrical portion 715c.

The second cylindrical portion 715d may have a diameter smaller than the first cylindrical portion 715c. The second cylindrical portion 715d and the first cylindrical portion 715c may be connected by an inclined connection portion 715e. In addition, the second cylindrical portion 715d may be press-fit into the shaft connection portion 752.

The shaft connection portion 752 may include an accommodation recess in which the second portion 715b of the shaft 715 is accommodated. The accommodation recess may include a first accommodation recess 752a in which the first cylindrical portion 715c is accommodated and a second accommodation recess 752b in which the second cylindrical portion 715d is accommodated.

The second cylindrical portion 715d may be accommodated in the second accommodation recess 752b after passing through the first accommodation recess 752a. In this case, the first cylindrical portion 715c may be smoothly accommodated in the first accommodation recess 752a by the inclined connection portion 715e.

An outer circumferential surface of the second cylindrical portion 715d may be knurled, for example, and the second cylindrical portion 715d may be press-fit into the second accommodation recess 752b. To this end, a diameter of the second cylindrical portion 715d may be larger than a diameter of the second accommodation recess 752b. Meanwhile, a diameter of the first cylindrical portion 715c may be equal to or smaller than a diameter of the first accommodation recess 752a.

An insertion recess 715f is formed around the second cylindrical portion 715d, and an insertion protrusion 752c is formed on the first accommodation recess 752a or the second accommodation recess 752b.

Therefore, according to the present embodiment, as the shaft 715 is press-fit into the shaft connection portion 752 and the insertion protrusion 752c is inserted into the insertion recess 715f, the shaft 715 may be prevented from being released from the shaft connection portion 752 or the shaft 715 is prevented from being idly rotated with respect to the shaft connection portion 752 in a state where the shaft is press-fit into the shaft connection portion 752.

In addition, since the diameter of the first cylindrical portion 715c is larger than the diameter of the second cylindrical portion 715d, although fine powder is produced while the second cylindrical portion 715d is press-fit into the second accommodation recess 752b, the first cylindrical portion 715c may block outflow of the fine powder.

The gear box 740 may include a first installation portion 741 to which the motor 710 is coupled and a second installation portion 747 on which the power transmission part 750 for transmitting power from the motor 710 is installed.

The first installation portion 741 and the second installation portion 747 may be integrally formed. The stator 711 of the motor 710 may be detachably coupled to the first installation portion 741.

In the present embodiment, the stator 711 may be installed in the first installation portion 741 in a state where the shaft 715 of the rotor 720 is connected to the shaft connection portion 752.

Therefore, a fastening force is not transmitted between the shaft connection portion 752 and the other gears (to be described later) while the stator 711 is installed in the first installation portion 741, thus preventing a slip phenomenon between the gears.

A coupling structure of the stator 711 and the first installation portion 741 will be described later with reference to the drawings.

The first installation portion 741 may be provided with a bearing support portion 745 for supporting the second bearing 717.

The second bearing 717 may be inserted into the bearing support portion 745. An opening 746 is provided at the bearing support portion 745, and the second portion 715b of the shaft 715 may pass through the opening 746 of the bearing support portion 745.

The second portion 715b of the shaft 715 penetrating through the opening 746 of the bearing support portion 745 may protrude to a space formed by the second installation portion 747.

The shaft connection portion 752 may be coupled to the second portion 715b of the shaft 715 in the space of the second installation portion 747.

The power transmission part 750 may include the shaft connection portion 752 and one or more gears 753, 754, 755, and 756 for transmitting power from the shaft connection portion 752 to the connection member 770.

FIG. 10 illustrates a plurality of gears 753, 754, 755, and 756 as an example. In the case of using the plurality of gears 753, 754, 755, and 756, it is possible to reduce a rotational speed of the motor 710 and to transmit torque of a required size to the connection member 770.

The plurality of gears may include a first gear 753, a second gear 754, a third gear 755, and a fourth gear 756.

Gear teeth may be formed around the shaft connection portion 752 and engage with the first gear 753 among the plurality of gears 753, 754, 755, and 756. Here, since the gear teeth are formed at the shaft connection portion 752, the shaft connection portion 752 may be described as a gear.

The plurality of gears 753, 754, 755, and 756 may be rotatably supported on the second installation portion 747 by a gear pin 758. In addition, the connection member 470 may be connected to a fourth gear 756, which is the last gear among the plurality of gears 753, 754, 755, and 756.

Here, in a state where the connection member 770 is located on one side of the first installation portion 747 and the fourth gear 756 is located on the other side of the connection member 770 with respect to the first installation portion 757, the connection member 770 may be fastened with the fourth gear 756 by a fastening member such as a screw.

In the present embodiment, a shaft connection portion 752 of the power transmission portion 750 connected to the motor 710 has a small torque, and the torque increases as it passes by the plurality of gears.

Therefore, in the present embodiment, the shaft connection portion 752 and the first gear 753 connected to the shaft 715 of the motor 710 may be formed of a polyoxymethylene (POM) material that may be used at low torque.

Meanwhile, the third gear 755 and the fourth gear 756 may be manufactured by sintering metal powder having increased strength so as to be used at high torque.

In addition, the second gear 754 may include a first gear portion 754a and a second gear portion 754b. The first gear portion 754a may be engaged with the first gear 753, and the second gear portion 754b may be engaged with the third gear 755.

Accordingly, the first gear portion 754a may be formed of, for example, polyoxymethylene (POM) material, and the second gear portion 745b may be formed of, for example, sintered metal powder.

In this case, a diameter of the first gear portion 754a is larger than a diameter of the second gear portion 754b.

After manufacturing the second gear portion 754b, the second gear portion 754 is manufactured by insert injection-molding the first gear portion 754a to surround an outer circumference of the second gear portion 754b.

The motor assembly 700 may further include a box cover 760 coupled to the gear box 740 and covering the power transmission part 750.

Figure 14:
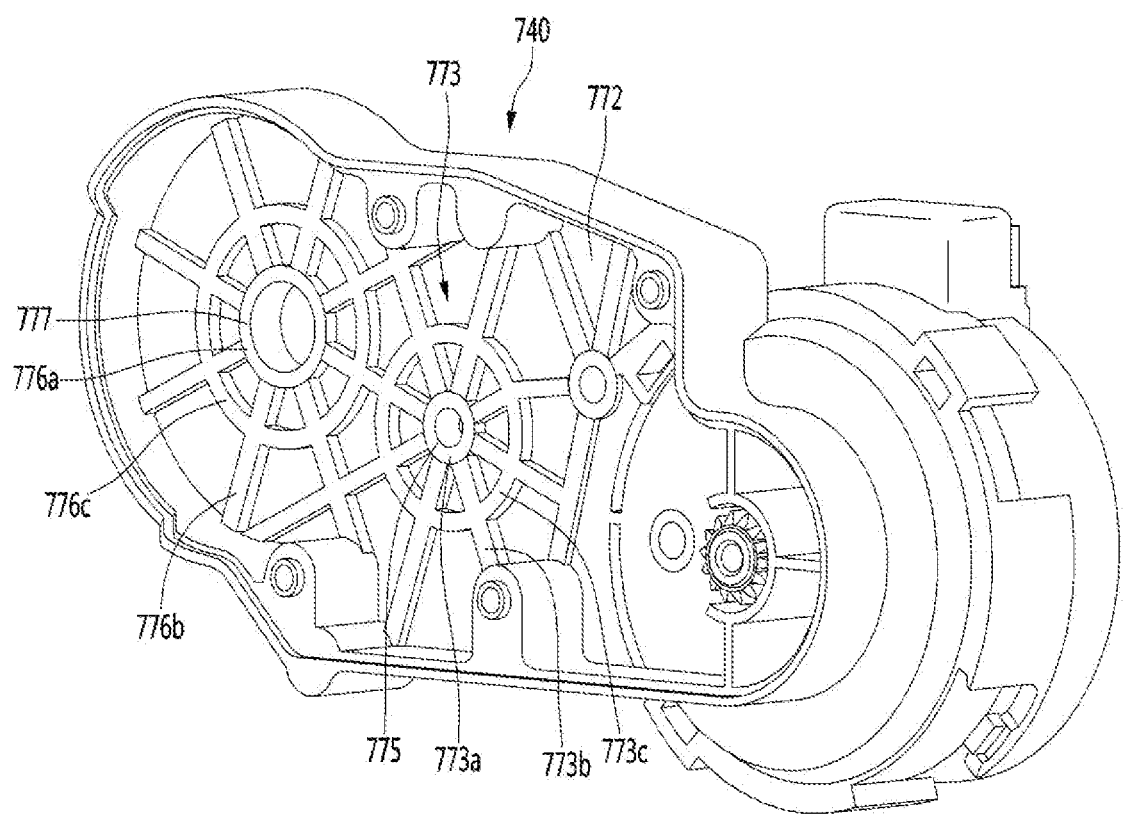
FIGS. 14 and 15 are perspective views of a gear box according to an embodiment of the present disclosure.
Figure 15:
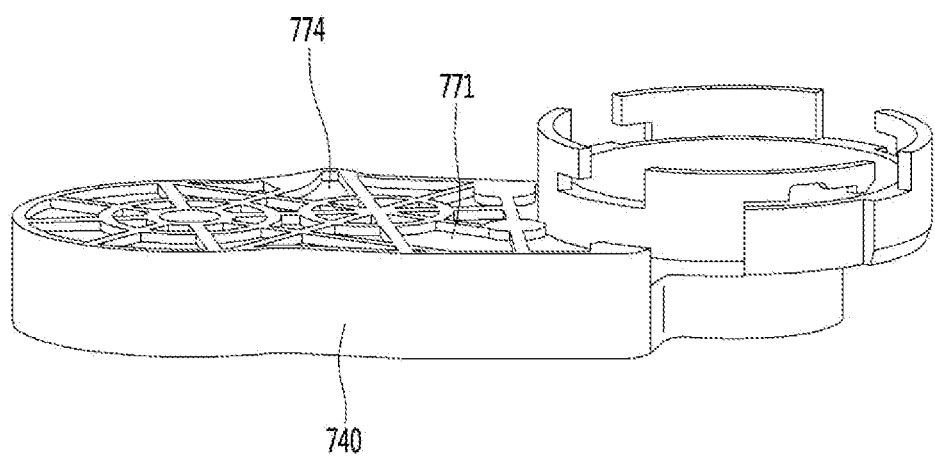

FIGS. 14 and 15 are perspective views of a gear box according to an embodiment of the present disclosure.

Referring to FIGS. 14 and 15, the second installation portion 747 of the gear box 740 may include a first wall 771 and a second wall 772 perpendicularly extending from an edge of the first wall 772.

In addition, the first wall 771 and the second wall 772 form a space for accommodating the power transmission part 750.

A surface forming a space in the first wall 771 that accommodates the power transmission part 750 is referred to as an inner surface, and a surface opposite to the inner surface is referred to as an outer surface.

Reinforcing ribs 773 and 774 are formed on each of the inner and outer surfaces of the first wall 771 to form strength of the first wall. That is, a first reinforcing rib 773 is formed on the inner surface of the first wall 771, and a second reinforcing rib 774 is formed on the outer surface of the first wall 771.

The reinforcing ribs 773 and 774 may protrude from the first wall 771 and may be formed in a symmetrical shape.

According to the present embodiment, when the reinforcing ribs are formed on each of the outer surface and the inner surface of the first wall 711, a thickness of one reinforcing rib may be reduced, thus preventing an increase in volume of the gear box, as compared with a case where the reinforcing rib is formed on the outer surface of the first wall 711.

Hereinafter, the first reinforcing rib 773 will be described in detail.

The reinforcing rib 773 may include a plurality of ribs.

The reinforcing rib 773 may include a first rib 773a having a cylindrical shape, a plurality of second ribs 773b extending from the first rib 773a in different directions, and a third rib 773c connecting the plurality of second ribs 773b.

In addition, a shaft accommodation recess 775 into which the shaft 758 of one of the plurality of gears is inserted may be formed at the first rib 773a. For example, the shaft 758 of the third gear 755 may be accommodated in the shaft accommodation recess 775.

According to the present embodiment, as the first rib 773a is formed at the shaft accommodation recess 775, damage to the gear box 740 by a force transmitted through the shaft 758 may be prevented.

For example, the plurality of second ribs 773b may extend radially from the first rib 773a. The third rib 773c may be formed in an arc shape to connect the plurality of second ribs 773c. Therefore, a line connecting the plurality of third ribs 773c may be formed in a circular shape.

A fourth rib 776a having a cylindrical shape may be formed at a position spaced apart from the first rib 773a on the first wall 711. The fourth rib 776a may have a diameter larger than the first rib 773a.

In addition, a plurality of fifth ribs 776b may extend in different directions from the fourth rib 776a. For example, the plurality of fifth ribs 776b may extend radially from the first rib 776a.

The plurality of fifth ribs 776b may be connected by a sixth rib 776c. The sixth rib 776c may be formed in an arc shape to connect the plurality of fifth ribs 776c. Therefore, a line connecting the plurality of sixth ribs 776c may be formed in a circular shape.

Some of the plurality of second ribs 773b may be connected to some of the plurality of fifth ribs 776b.

In addition, a shaft hole 777 through which a rotary shaft of the fourth gear 756 penetrates may be formed at the fourth rib 776a.

Figure 16:
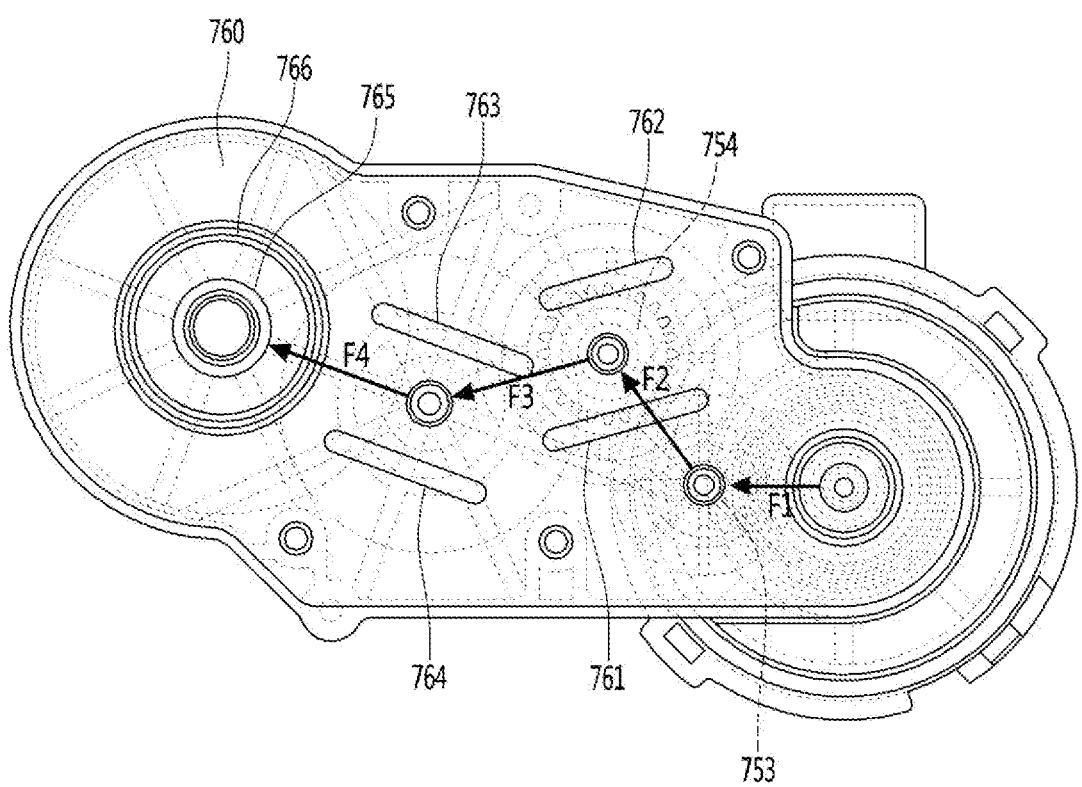
FIG. 16 is a view illustrating a box cover according to an embodiment of the present disclosure.

FIG. 16 is a diagram illustrating a box cover according to an embodiment.

Referring to FIGS. 10 and 16, the box cover 760 may be fastened to the second installation portion 747 in a state of covering the power transmission part 750.

The box cover 760 may be provided with a plurality of embossings for strength reinforcement. The plurality of embossings may be designed in consideration of a force transmission direction of the plurality of gears.

For example, the plurality of embossings may be formed to protrude to the outside by pressing one surface of the box cover 760.

For example, the plurality of embossings may include a first embossing 761 and a second embossing 762 extending substantially parallel to each other.

The first embossing 761 and the second embossing 762 may extend in a linear shape.

The first embossing 761 may be disposed to cross a line connecting a rotation center of the first gear 753 to a rotation center of the second gear 754.

In addition, the first embossing 761 may be located between the rotation center of the first gear 753 and the rotation center of the second gear 754.

The second embossing 762 is located farther from the first gear 753 than the first embossing 761. In addition, a rotation center of the second gear 754 may be positioned between the first embossing 761 and the second embossing 762.

The plurality of embossings may further include a third embossing 763 and a fourth embossing 764 extending substantially parallel to each other.

The third embossing 763 may be disposed to cross a line connecting a rotation center of the second gear 754 and a rotation center of the third gear 755.

In addition, a rotation center of the third gear 755 may be located between the third embossing 763 and the fourth embossing 764.

The third embossing 763 and the fourth embossing 764 may extend in parallel with a line connecting the rotation center of the third gear 755 and the rotation center of the fourth gear 756.

An extending direction of the first embossing 761 and the second embossing 762 may be perpendicular to an extending direction of the third embossing 763 and the fourth embossing 764.

The box cover 760 may include a hole 765 through which the rotation shaft of the fourth gear 756 penetrates, and the plurality of embossings may further include a fifth embossing disposed around the hole 765. That is, the hole 765 may be located in an area formed by the fifth embossing 766.

These embossings are arranged around the high torque gears to effectively prevent deformation of the box cover.

Figure 17:
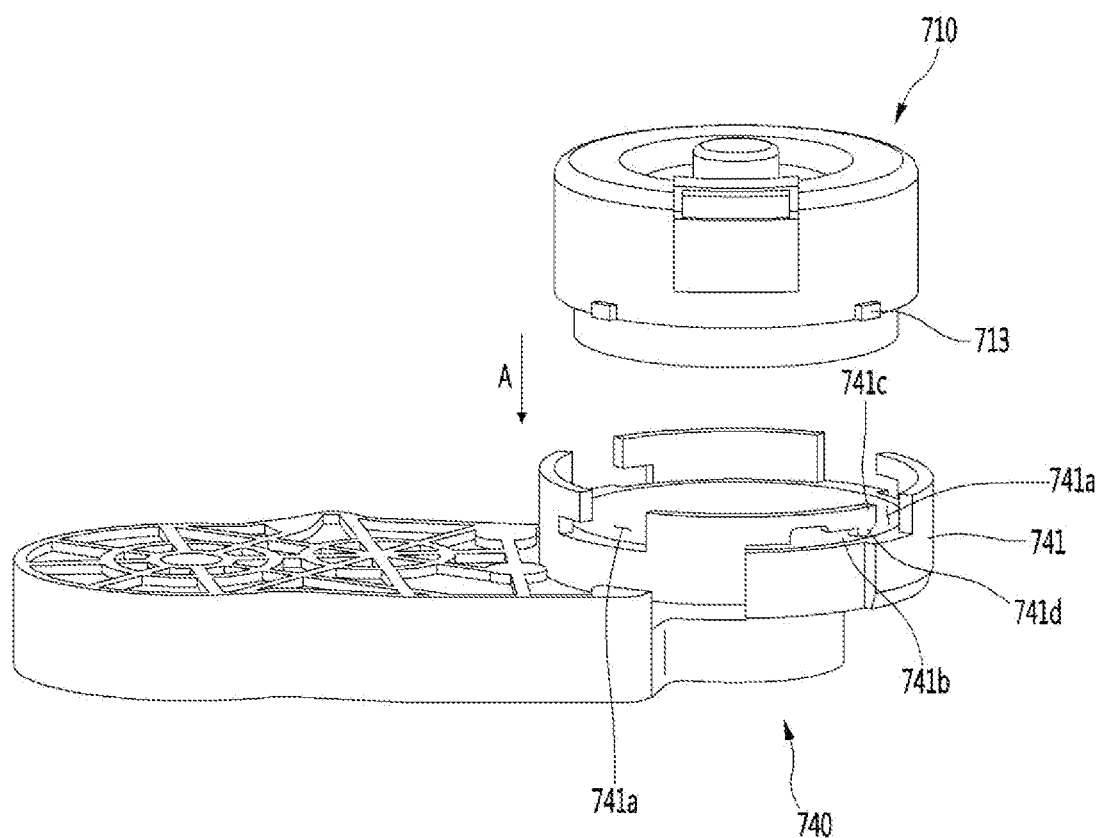
FIG. 17 is a view showing a state where a stator of a motor is detached from a gear box.
Figure 18:
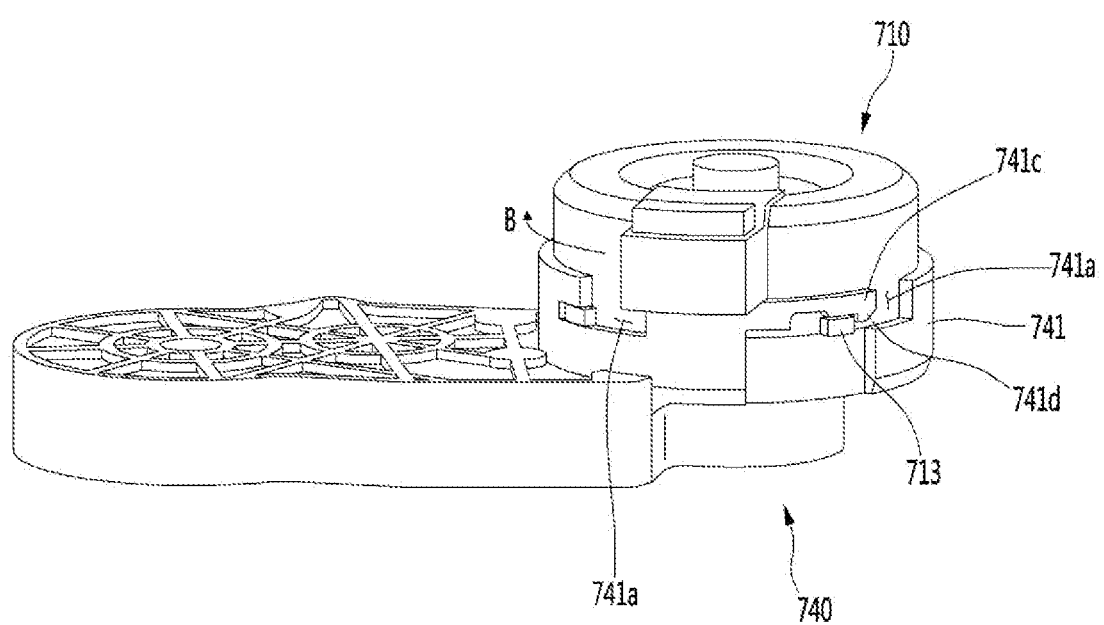
FIG. 18 is a view showing a state where a stator of a motor is coupled to a gear box.

FIG. 17 is a view showing a state where the stator of the motor is separated from the gear box, and FIG. 18 is a view showing a state where the stator of the motor is coupled to the gear box.

Referring to FIGS. 5, 17, and 18, in a state where the rotor 720 is connected to the power transmission part 750 by the shaft 715 (the rotor 720 is connected to the gear box), the stator 710 may be separated from the rotor 720 and the gear box 740. This is because, in the present embodiment, the stator 710 is a component that exists independently of the rotor 420.

In the related art, when the stator 710 needs to be replaced, the entire motor should be replaced. However, according to the present embodiment, since the stator 710 and the rotor 720 may be separated, only the stator 710 may be separated from the gear box 740 and replaced, a replacement cost may be reduced.

In order to couple the stator 710 and the gear box 740, the stator 710 may have a first coupling portion and the gear box 740 may have a second coupling portion to which the first coupling portion may be detachably coupled.

As an example, the first coupling portion may include a protrusion 713, and the second coupling portion may include a protrusion coupling portion 741c to which the protrusion is coupled.

For example, the protrusion 713 may protrude in a horizontal direction from the circumference of the housing 711a.

The protrusion coupling portion 741c may include a hook 741d to be caught by the protrusion 713.

The protrusion coupling portion 741c may be provided at the first installation portion 741 of the gear box 740.

In order for the protrusion 713 to be coupled to the protrusion coupling portion 741c, the first installation portion 741 may include slots 741a and 741b allowing the protrusion 713 to be inserted or accommodated therein. The slots 741a and 741b may be recesses or holes.

The slots 741a and 741b may include a first slot 741a extending in a direction parallel to a direction in which the shaft 715 extends and a second slot 741b extending from an end portion of the shaft 715 in a direction perpendicular to the extending direction of the shaft 715.

The first installation portion 741 may be formed, for example, in a cylindrical shape, and the second slot 741b may extend in a circumferential direction of the first installation portion 741. When the slots 741a and 741b are holes, the protrusion coupling portion 741c may be elastically deformed by the slots 741a and 741b.

Therefore, in order to couple the stator 710 to the first installation portion 741, the protrusion 713 of the stator 710 is aligned with the first slot 741a.

Next, the stator 710 is moved in a direction of the arrow A in the drawing so that the protrusion 713 is inserted into the first slot 741a.

In addition, when the protrusion 713 is aligned with the second slot 741b in a state where the protrusion 713 is inserted into the first slot 741a, the stator 710 is rotated in the direction of B (clockwise direction) in the drawing.

Then, the protrusion 713 is moved in the second slot 741b and the hook 741d of the protrusion coupling portion 741c is caught by the protrusion 713, so that the coupling of the stator 710 and the first installation portion 741 is completed.

The rotor 720 is accommodated in the space 712 of the stator 710 in a state where the stator 710 is coupled to the first installation portion 741.

In order to present the stator 710 from being separated from the gear box 740 due to vibration generated in the process of rotation of the rotor 710 and transmitted to the gear box 740, a plurality of protrusions 713 are provided at the stator 710 and a plurality of protrusion coupling portions 741c may be provided at the first installation portion 741.

For example, the plurality of protrusions 713 may be arranged in a circumferential direction of the stator 410. In addition, the plurality of protrusion coupling portions 741c may be arranged to be spaced apart from each other in the circumferential direction at the first installation portion 741.

In this case, some or all of the plurality of protrusion coupling portions 741c may include the hook 741d.

If the stator 710 is coupled to the gear box 740 using a fastening member such as a screw, an assembling process for coupling the stator 710 to the gear box 740 may be complicated.

In addition, since a structure for fastening the fastening member to the gear box 740 is to be formed, a volume of the gear box 740 is increased and the structure of the gear box 740 may be interfered with a peripheral component.

However, in case where the protrusion 713 is formed on the stator 710 and the protrusion coupling portion 741c for coupling the protrusion 713 to the gear box 740 is formed as in the present disclosure, the stator 710 may be easily coupled and separated and an increase in the volume of the gear box 740 may be prevented.

A height of the first installation portion 741 may be lower than that of the stator 710 so that the user may grip the stator 710 in the process of separating the stator 710 from the gear box 740.

The invention claimed is:

1. A refrigerator comprising:
a cabinet having a storage compartment;
a refrigerator door configured to open and close the storage compartment;
an ice maker provided at the storage compartment or the refrigerator door;
an ice bin configured to accommodate ice produced in the ice maker; and
a motor assembly configured to generate power to be supplied to the ice bin,
wherein the motor assembly comprises:
a BLDC motor;
a gear box configured to allow the BLDC motor to be installed therein; and
a power transmission part installed at the gear box and having a plurality of gears configured to transmit power generated by the BLDC motor to the ice bin,
wherein the BLDC motor comprises a stator and a rotor rotated with respect to the stator and installed on the gear box, and
the rotor is connected to the power transmission part by a shaft and the stator is separably coupled to the gear box,
wherein the stator is separated from the gear box in a state in which the rotor is connected to the power transmission part, and
wherein the stator includes a first coupling portion, and the gear box includes a second coupling portion to which the first coupling portion is separably coupled.

2. The refrigerator of claim 1,
wherein the stator has a space for accommodating the rotor when the stator is coupled to the gear box.

3. The refrigerator of claim 1,
wherein the first coupling portion comprises a protrusion protruding from the stator, and
the second coupling portion comprises a protrusion coupling portion to which the protrusion is coupled.

4. The refrigerator of claim 3,
wherein the gear box comprises a slot configured to accommodate the protrusion to allow the protrusion to be coupled to the protrusion coupling portion, and
the slot comprises: a first slot extending in a direction parallel to an extending direction of the shaft; and
a second slot extending from the first slot in a direction perpendicular to the first slot.

5. The refrigerator of claim 4,
wherein the protrusion coupling portion comprises a hook to be caught by the protrusion in a state where the protrusion moves to the second slot.

6. The refrigerator of claim 3,
wherein the protrusion is coupled to the protrusion coupling portion or released from the protrusion coupling portion according to a rotational operation of the stator.

7. The refrigerator of claim 1,
wherein the gear box comprises an installation portion having a cylindrical shape to allow the BLDC motor to be installed therein,
a plurality of first coupling portions are arranged in a circumferential direction of the stator and spaced apart from each other, and
a plurality of second coupling portions are arranged in a circumferential direction of the installation portion and spaced apart from each other.

8. The refrigerator of claim 1,
wherein the shaft protrudes to both sides of the rotor through the rotor, and
the shaft penetrating through the rotor is connected to the power transmission part through the gear box.

9. The refrigerator of claim 8,
wherein a first bearing is coupled to a first portion of the shaft protruding from one side of the rotor, and
the stator comprises a depressed portion for accommodating the first bearing.

10. The refrigerator of claim 8,
wherein a second bearing is coupled to a second portion of the shaft protruding from the other side of the rotor, and
the gear box comprises a bearing support portion configured to support the second bearing.

11. The refrigerator of claim 10,
wherein the power transmission part comprises a shaft connection portion connected to the second portion of the shaft penetrating through the bearing support portion, and
the shaft is press-fit into the shaft connection portion.

12. The refrigerator of claim 11,
wherein the second portion of the shaft comprises a first cylindrical portion and a second cylindrical portion extending from the first cylindrical portion and having a diameter smaller than a diameter of the first cylindrical portion,
the shaft connection portion comprises a first accommodation recess configured to accommodate the first cylindrical portion and a second accommodation recess configured to accommodate the second cylindrical portion, and
the second cylindrical portion is press-fit into the second accommodation recess by passing through the first accommodation recess.

13. The refrigerator of claim 10,
wherein the shaft connection portion and some gears, among the plurality of gears, connected to the shaft connection portion are formed of a first material,
a last gear, among the plurality of gears, connected to the ice bin is formed of a second material,
the other gears, among the plurality of gears, transmitting power between the final gear and the gears formed of the first material comprises a first gear portion and a second gear portion which are integrally formed, and
the first gear portion is formed of the same material as the first material and the second gear portion is formed of the same material as the second material.

14. The refrigerator of claim 1,
wherein the gear box comprises a first installation portion allowing the BLDC motor to be installed therein and a second installation portion integrally formed with the first installation portion,
the second installation portion comprises a first wall and a second wall extending perpendicularly from an edge of the first wall, and
the power transmission part is installed in a space formed by the first wall and the second wall.

15. The refrigerator of claim 14,
wherein a reinforcing rib is provided on each of an outer surface and an inner surface of the first wall.

16. The refrigerator of claim 15,
wherein the reinforcing rib comprises a first rib having a cylindrical shape, a plurality of second ribs extending in different directions from the first rib, and a third rib connecting the plurality of ribs.

17. The refrigerator of claim 16,
wherein at least one of the plurality of gears is installed at the second installation portion by the shaft, and
a shaft accommodation recess allowing the shaft to be inserted therein is provided at the first rib.

18. The refrigerator of claim 14,
wherein the motor assembly further comprises a box cover configured to cover the plurality of gears installed at the second installation portion, and
the box cover comprises a plurality of embossings for increasing strength.

19. The refrigerator of claim 18,
wherein the plurality of embossings comprises a first embossing and a second embossing extending in parallel to each other, and
rotation centers of some of the plurality of gears are positioned between the first embossing and the second embossing.

20. The refrigerator of claim 19,
wherein the first embossing extends to cross a line connecting rotation centers of two adjacent gears among the plurality of gears.

21. The refrigerator of claim 19,
wherein the plurality of embossings further comprises a third embossing and a fourth embossing extending in parallel to each other, and
rotation centers of the other of the plurality of gears are positioned between the third embossing and the fourth embossing.

22. The refrigerator of claim 21,
wherein extending directions of the third embossing and the fourth embossing are parallel to a line connecting rotation centers of two adjacent gears among the plurality of gears.

23. The refrigerator of claim 19,
wherein the gear box further comprises a hole through which a rotary shaft of the last gear among the plurality of gears passes and a fifth embossing formed around the hole.

* * * * *